No. 623,225. Patented Apr. 18, 1899.
G. N. THOMPSON.
PLANT HOEING DEVICE.
(Application filed Dec. 27, 1898.)

(No Model.)

Witnesses
Inventor
George N. Thompson
By W. E. Simonds
Attorney

UNITED STATES PATENT OFFICE.

GEORGE N. THOMPSON, OF SUFFIELD, CONNECTICUT.

PLANT-HOEING DEVICE.

SPECIFICATION forming part of Letters Patent No. 623,225, dated April 18, 1899.

Application filed December 27, 1898. Serial No. 700,354. (No model.)

*To all whom it may concern:*

Be it known that I, GEORGE N. THOMPSON, a citizen of the United States of America, residing at Suffield, in the county of Hartford and State of Connecticut, have invented a certain new and useful Plant-Hoeing Device Specially Useful in Hoeing Tobacco, of which the following is a description, reference being had to the accompanying drawings, wherein—

Figure 1:
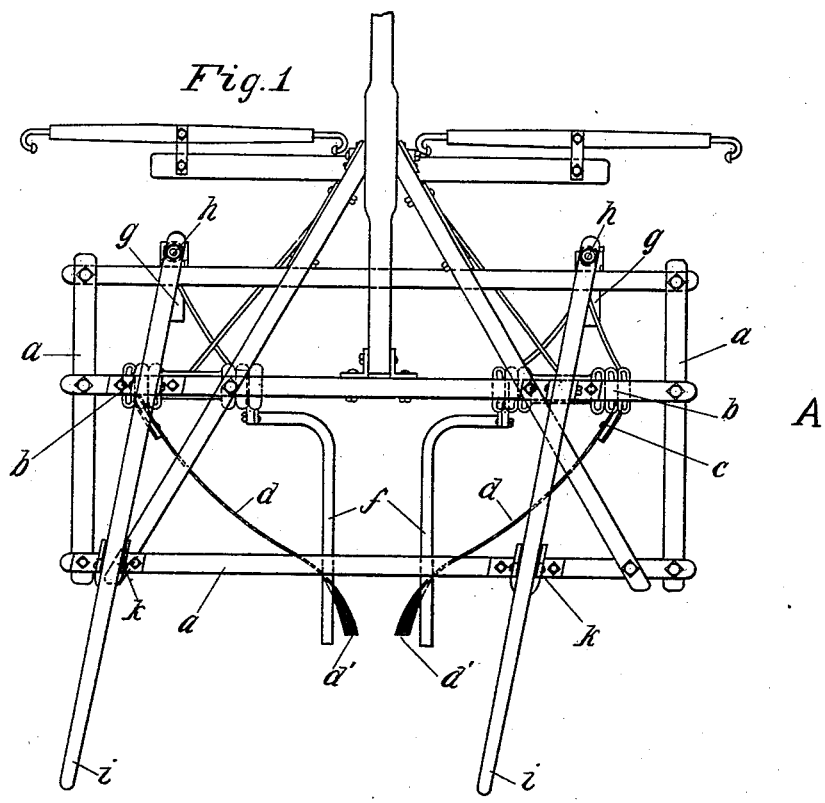
Figure 2:
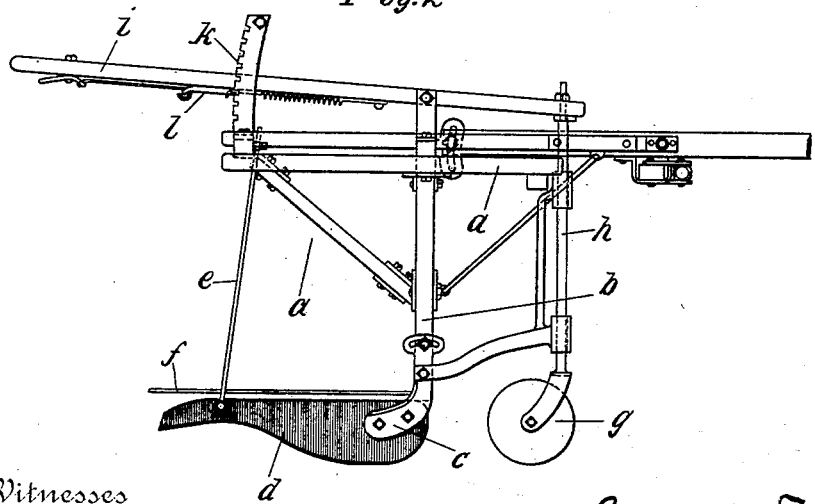

Figure 1 is a top view of a machine embodying such improvement. Fig. 2 is a side elevation of the same from side A.

The object of the improvement is denoted by its title—the production of a machine for hoeing plants and specially useful in hoeing young tobacco-plants.

In the accompanying drawings the letter $a$ denotes the general frame of the machine. $b$ denotes two standards secured thereto, to which are attached the hoeing-blades, soon to be mentioned.

The letter $c$ denotes certain intermediates between the standards and the hoeing-blades, which latter are secured to the standards and are capable of a certain rotary adjustment thereon.

The letter $d$ denotes the hoeing-blades. The shape of these blades is important and essential. There are two of them. They approach or converge rearwardly and are made to diminish in vertical dimension toward the rear by removing a portion of the material at the bottom of the blades, and the lower portion, near the rear end of each, is turned outwardly, as seen at $d$, so as to form an inclined portion. This particular shape is the result of study and experiment, and actual use demonstrates that it has great practical advantages. The rear end of each blade is supported upon the frame by supporting adjustable rods $e$, which are pivoted to the free ends of the blades and are adjustable in the frame.

The letter $f$ denotes two plant-lifters, which have an open space between them from front to rear for the passage of the plant. Their front ends pass easily under the leaves of the plant and lift them and hold them lifted while the hoeing-blades are doing their work. These lifters are attached to the same standards as the hoeing-blades and are secured in such a position that they stand in proximity to the blades.

The letter $g$ denotes small wheels upon which the whole machine is carried. They are borne by the shafts $h$ and are free to turn with that shaft in any direction.

The letter $i$ denotes levers pivoted to the frame of the machine and taking hold of the wheel-shafts $h$. These levers may be held at any desired point along the racks $k$ by spring-latches $l$. It will be readily understood that by manipulation of these levers $i$ the entire machine can be raised or lowered.

I claim as my improvement—

1. In combination, the two rearwardly-converging hoeing-blades each narrowed in vertical dimension toward the rear by removal of material at the bottom and the lower edge only of the narrowed portion of each blade being turned outwardly to form an inclined end, all substantially as described and for the purposes set forth.

2. In a hoeing-machine the combination with a frame and standards secured thereto; of two rearwardly-converging hoeing-blades each adjustably connected at one end to the standards and being narrowed in vertical dimension toward the rear by the removal of material from the bottom, the lower edge of each blade being turned outward to form an incline and additional means for adjustably supporting the other ends of the blades substantially as and for the purpose set forth.

3. In a hoeing-machine the combination with a frame and standards secured thereto; of hoeing-blades adjustably secured at one end to the standards, adjustable rods secured to their other ends and passing through the frame and a plant-lifter secured to each standard so as to stand in proximity to the blades substantially as and for the purpose set forth.

4. In combination, the frame of the machine, the standards for the attachment of the hoeing-blades, the plant-lifters also secured to each standard and forming an open space between them from front to rear, the wheels, and the levers for raising and lowering the frame upon the wheels, all substantially as described and for the purposes set forth.

GEORGE N. THOMPSON.

Witnesses:
E. S. THAYER,
CHAS. L. SPENCER.